United States Patent
Petty et al.

(10) Patent No.: US 10,159,215 B2
(45) Date of Patent: Dec. 25, 2018

(54) PET LITTER TRAY, BOX, AND SYSTEM

(71) Applicant: Luuup Inc., Toronto (CA)

(72) Inventors: Nicholas Petty, Toronto (CA); Ralph P. Gumpesberger, London (GB)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 15/404,949

(22) Filed: Jan. 12, 2017

(65) Prior Publication Data

US 2018/0192610 A1    Jul. 12, 2018

(51) Int. Cl.
*A01K 29/00* (2006.01)
*A01K 1/01* (2006.01)

(52) U.S. Cl.
CPC .................. *A01K 1/0114* (2013.01)

(58) Field of Classification Search
CPC .... A01K 1/0114; A01K 1/0107; A01K 1/011; A01K 1/01; A01K 31/04; A01K 1/0125
USPC ........ 119/166, 165, 161; 209/355, 353, 354, 209/356; 206/505, 506, 507, 509, 511, 206/518, 519, 520
See application file for complete search history.

(56) References Cited

U.S. PATENT DOCUMENTS

| | | | |
|---|---|---|---|
| 4,217,857 A | 8/1980 | Geddie | |
| 4,505,226 A * | 3/1985 | Carlson | A01K 1/0114 119/166 |
| 4,615,300 A * | 10/1986 | McDonough | A01K 1/0107 119/167 |
| 5,325,815 A | 7/1994 | Gumpesberger | |
| 5,517,947 A | 5/1996 | Christman | |
| 5,598,811 A * | 2/1997 | Merchant | A01K 1/0114 119/166 |
| 5,755,182 A * | 5/1998 | Brown, Jr. | A01K 1/0114 119/165 |
| 5,797,346 A | 8/1998 | Lewis | |
| 5,799,610 A * | 9/1998 | Poulos | A01K 1/0114 119/166 |
| 6,941,894 B2 | 9/2005 | D'Anielo et al. | |

(Continued)

FOREIGN PATENT DOCUMENTS

| CA | 2173510 A1 | 10/1997 |
| CN | 205756265 U | 12/2016 |

OTHER PUBLICATIONS

Office Action dated Aug. 28, 2017 issued in corresponding Canadian Patent Application No. 2,955,134.

*Primary Examiner* — Trinh T Nguyen
(74) *Attorney, Agent, or Firm* — Borden Ladner Gervias LLP; Brandon L. Evenson

(57) ABSTRACT

A pet litter tray, box and system. The litter box comprises multiple trays. The trays are nestable within one another. Each tray comprises a base defining one or more openings. The opening allows litter to pass therethrough. When stacked in a first orientation, the openings of each upper tray are blocked by portions of the base of the adjacent lower tray thus retaining the litter. The top-most tray is lifted to sift the unused litter into the two nested lower trays. The top-most tray is added to the bottom of the two nested trays in a selected orientation. The trays may comprise flanges extending from the openings to contact the base of the lower tray when stacked to retain litter. The trays may comprise protrusions extending from the rim to contact an adjacent lower tray to indicate improper orientation of the trays.

19 Claims, 12 Drawing Sheets

(56) References Cited

U.S. PATENT DOCUMENTS

| | | | |
|---|---|---|---|
| 2007/0068461 A1* | 3/2007 | Hill | A01K 1/0114 119/166 |
| 2012/0325159 A1* | 12/2012 | Penner | A01K 1/0114 119/166 |
| 2014/0251224 A1* | 9/2014 | Yamamoto | A01K 1/0114 119/165 |
| 2015/0068944 A1* | 3/2015 | Zhang | B65D 21/0233 206/505 |
| 2016/0145002 A1* | 5/2016 | Hsu | B65D 21/0233 206/518 |
| 2016/0219828 A1* | 8/2016 | Goerz | A01K 1/011 |
| 2017/0118946 A1* | 5/2017 | Sareyani | A01K 1/0125 |

* cited by examiner

US 10,159,215 B2

PET LITTER TRAY, BOX, AND SYSTEM

FIELD

This disclosure relates to pet waste devices.

BACKGROUND

U.S. Pat. No. 5,325,815 incorporated herein by reference discloses a sifting device for pets to deposit their waste, and for a user to separate the waste from the pet litter for disposal. The device has three nestable sifting trays. Each tray has handles, sidewalls, and a base. The thickness of the tray steadily increases when going from the handles to the base. Each tray base defines openings therethrough. When stacked, the bottom surface of each upper-tray is in direct continuous contact with the top surface of the tray therebeneath. When two trays are stacked in the proper configuration, the openings do not overlap. This inhibits the litter from passing through the openings in the upper tray. To sift, a user lifts the top-most tray from the two bottom trays to expose the top-most tray grating. The top-most tray is shaken causing litter to fall through the grating while the pet waste stays in the top-most tray. Once the waste is disposed, the top-most tray is made the bottom tray of the two other nested trays. Failure to properly orient the top-most tray as the bottom tray, however, may lead to litter inadvertently spilling from the device via the grating.

SUMMARY OF THE INVENTION

A pet litter tray, box and system. The litter box comprises multiple trays. The trays are nestable within one another. Each tray comprises a base defining one or more openings. The opening allows litter to pass therethrough. When stacked in a first orientation, the openings of each upper tray are blocked by portions of the the base of the adjacent lower tray thus retaining the litter. The top-most tray is lifted to sift the unused litter into the two nested lower trays. The top-most tray is added to the bottom of the two nested trays in a selected orientation. The trays may comprise flanges extending from the openings to contact the base of the lower tray when stacked to retain litter. The flanges help keep the tray base thin but maintain rigidity and strength. The flanges may also help separate the trays from one-another when nested. The flanges may have bridges therebetween. The trays may comprise protrusions extending from the rim to contact an adjacent lower tray to indicate improper orientation of the trays.

In an embodiment, the tray may comprise a base defining an opening to allow material to pass through; a flange extending from the opening, the flange configured to contact the base of a second tray in a selected orientation to retain a material in the tray; and a sidewall extending from the base to retain the siftable material.

The second tray may be the same as the tray.

The tray may comprise a rim extending from the sidewall, and a protrusion extending from the rim to contact the second tray when the tray is nested in a second selected orientation within the second tray.

The tray may comprise a second flange and a bridge extending from the flange to the second flange.

In an embodiment, the litter box may comprise a plurality of trays, each tray configured to be nested in a first orientation within any of the other trays, each tray comprising a base defining an opening to allow a material to pass through; a flange extending from the opening for contacting the base of a lower tray to retain the material; and a sidewall extending from the base to retain the material.

The flange may extend around the periphery of the opening. The thickness of the base and the sidewall may be the same. There may be three or more trays.

Each of the trays may comprise a rim extending from the sidewall, and a protrusion extending from the rim to contact a lower tray when the tray is nested in a second orientation within the lower tray.

Another embodiment of the litter box may comprise a plurality of trays, each tray configured to be nested within any of the other trays, each tray comprising a base defining an opening to allow a material to pass through; a sidewall extending from the base to retain the material; a rim extending from the sidewall, and a protrusion extending from the rim, wherein the protrusion of an upper tray contacts the rim of an immediately lower tray when the upper tray is nested in a second orientation within the lower tray.

The number of trays may be three or more. The trays may be identical to one another.

The rim may define an opening, the opening for permitting a protrusion of a rim of an upper tray to pass therethrough when the trays are in the first orientation. The opening may be a smaller width rim. The opening may be an aperture. The opening may be a notch The protrusion may form a pivot point at its end.

Each of the trays may further comprise a flange extending from around the opening to a position such that when any upper tray of the trays is nested in a first orientation within an immediately lower tray, the flange of the upper tray contacts the base of the lower tray to retain a material.

DETAILED DESCRIPTION

Figure 1:
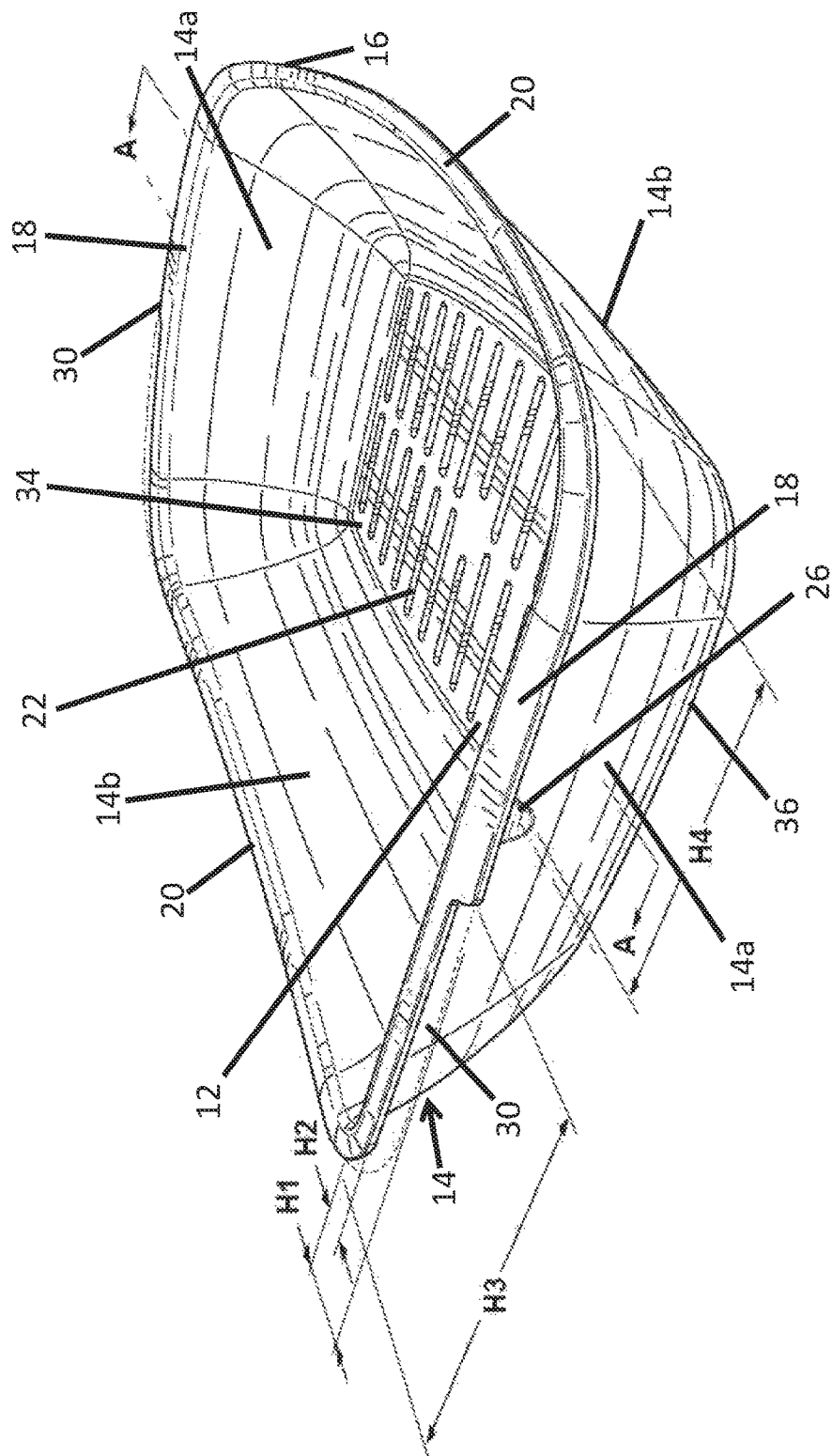
FIG. 1 shows a perspective view of an embodiment of a sifting tray according to the present disclosure.

FIGS. 1-4 show different views of an embodiment of a sifting tray 10 according to the present disclosure. The sifting tray 10 has a rectangular-like cross-section, and comprises a base 12 and four sidewalls 14 that comprise a first pair of opposing side walls 14a and a second pair of opposing side walls 14b. The sidewalls 14 are connected to the base 12 to enclose a space for containing a granular material, such as pet litter. The base 12 has an upper surface 34 and a lower surface 36. The tray may be of any shape such as circular and square.

The base 12 defines a plurality of slots or openings 22 (also referred to as grates) extending from the upper surface 34 through to the lower surface 36. The slots 22 are for allowing pet litter to pass through the base. The figures show the grates extending vertically across the base 12. The plurality of slots 22 may be arranged in any other pre-set pattern to allow the sifting tray to be used with one or more substantially identical trays to form a sifting system of the present invention as discussed below. Having a system which uses identical trays can help reduce manufacturing costs. Manufacturing different trays can, for example, significantly increase the tooling costs since a unique mold would be required for each different tray.

Any slots arrangements may be used so long as, when the nestable trays are stacked correctly, the slots of a top tray are blocked by the upper surface of one or more lower trays. The slots 22 may be sized and shaped to ensure that a siftable material such as the solid waste or the clumped litter is able to be trapped and separated from the remaining unused litter when sifting. In this embodiment, the slots 22 are each elongated and narrow ones. The slots may also be round, square or the like in shape.

The interior space defined by the base 12 and the sidewalls 14 is shaped to allow another substantially identical sifting tray to be nested inside. To that end, the sidewalls 14 extend upwardly and outwardly from the base 12 at certain angles such that the lower surface of the base 12 of one upper tray is able to reach down to contact the upper surface of the base 12 of another lower adjacent tray in the stack of the trays.

Figure 2:
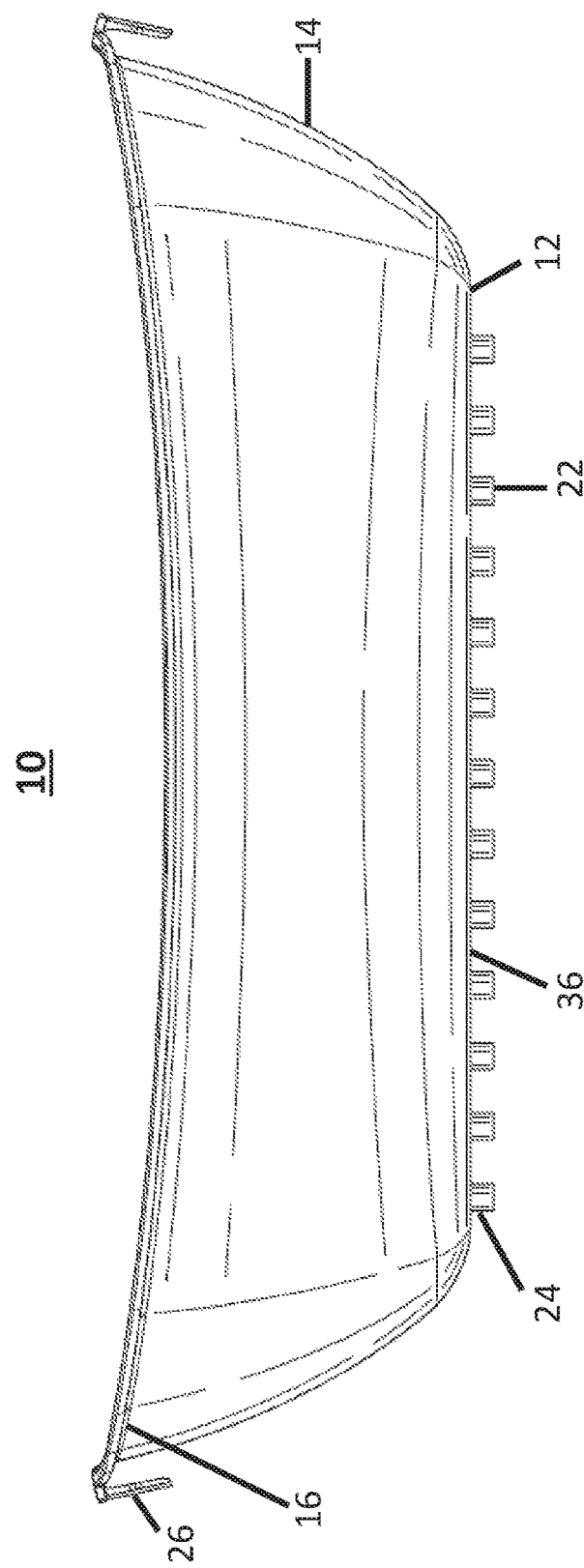
FIG. 2 shows a side view of the sifting tray of FIG. 1.
Figure 3:
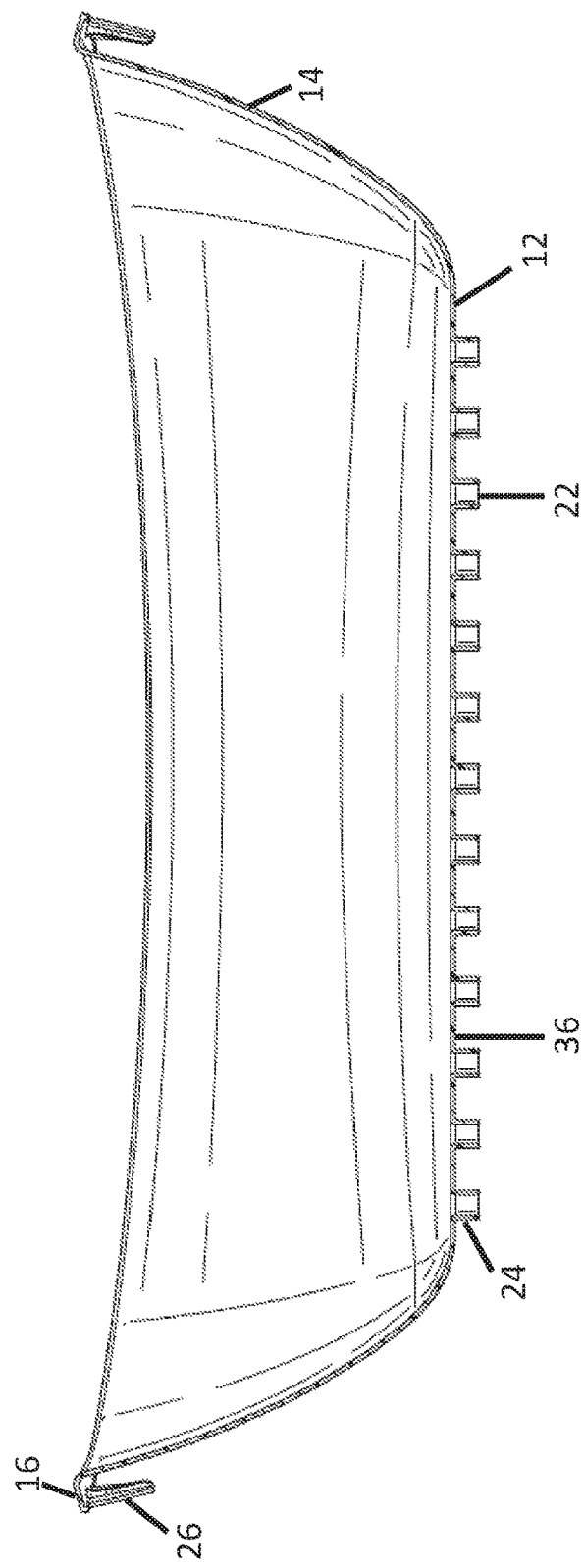
FIG. 3 shows a cross-section side view of the sifting tray of FIG. 1 taken from cut lines A-A.
Figure 4:
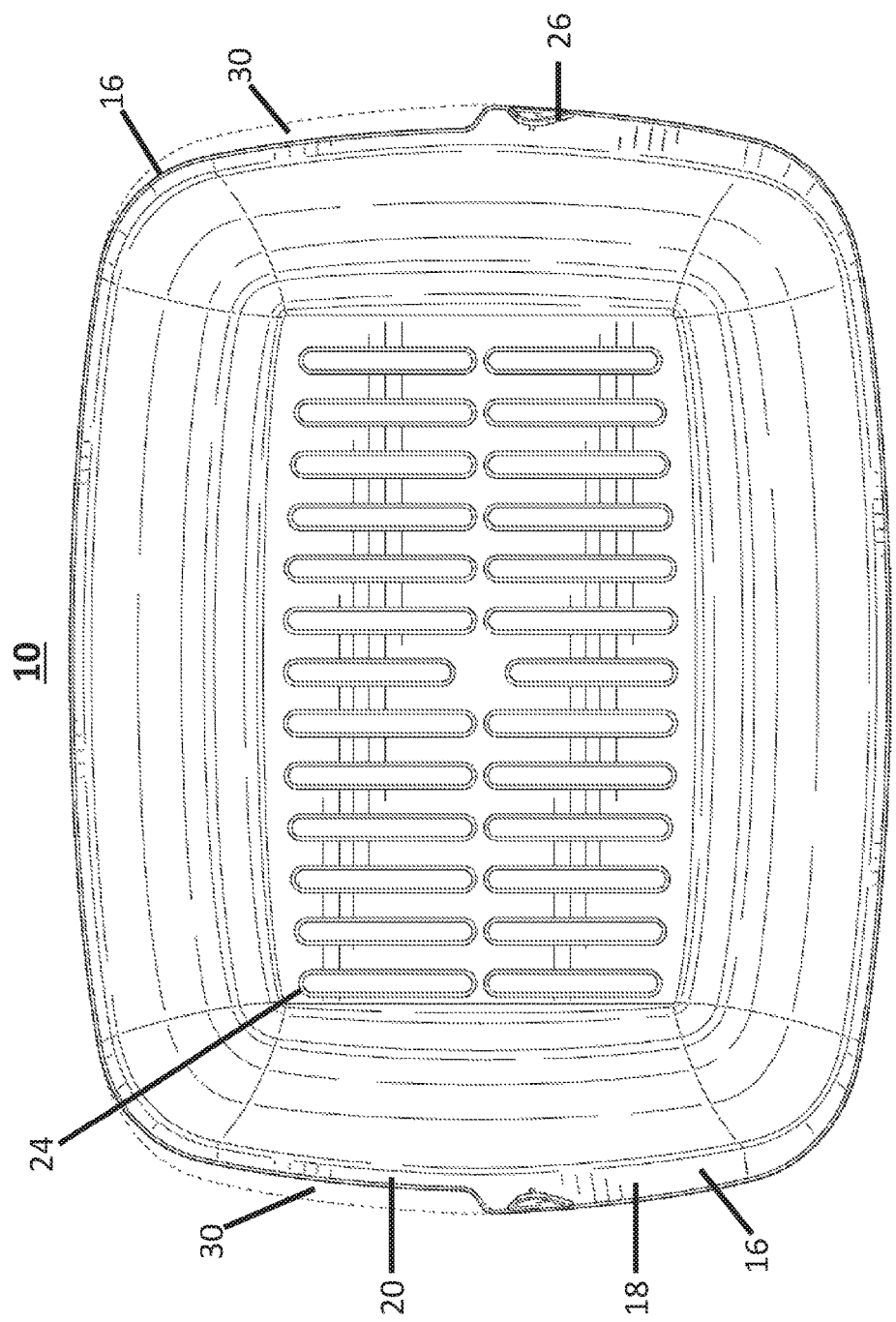
FIG. 4 shows a bottom view of the sifting tray of FIG. 1.

Referring to FIG. 2, each of the slots 22 of the sifting tray 10 may comprise a flange 24 around the periphery of the slot 22. The flange 24 extends downwardly from the lower surface 36 of the base 12. The flanges 24 are lips or collars that protrude downward from the base 12. The flange 24 may have a height that is two or more times thicker than the base 12. The flanges 24 may each have a smooth bottom surface that has a contour corresponding to that of the upper surface 34 of the base 12. When two trays 10 are stacked one on top of the other in the correct orientation, the bottom of the flanges 24 of the upper sifting tray may contact the upper surface of the lower sifting tray. This contact inhibits the litter from fully passing through the upper tray into the lower tray, and out of the slots of the lower tray. In effect, the flanges 24 create pockets of litter within the slots 22. The flanges 24 can help reduce the overall thickness of the base of the tray 10 but still create contact between the trays 10 to inhibit litter from completely passing from out of the top tray into the bottom tray. Reducing the thickness of the tray base 12 helps reduce the total amount of material used which, in turn, can help reduce material costs, manufacturing costs, and shipping costs (from weight savings). Reducing tray weight may also be helpful since a user needs to lift the tray to sift the litter from the waste. Flanges 24 can also help stiffen or strengthen the base notwithstanding reducing the amount of material used in the base 12. The flanges 24 may allow the thickness of the base of the tray to be similar to the thickness of the walls of the tray and other parts of the tray.

In an embodiment, the tray 10 comprises a rim 16 extending outwardly from the sidewalls 14 at the top. The rim 16 may have a substantially planar top face and a bottom face. In one embodiment, the rim 16 comprises a first portion 18 with a first width H1 and a second portion 20 with a second width H2, in which the first width H1 is greater than the second width H2. Due to the width difference, a recessed area 30 may be formed as shown by the area enclosed by the stippled lines. The rim 16 may extend continuously or partially around the periphery of the sidewalls 14 of the sifting tray 10. In the embodiment shown in FIGS. 1-4, the rim 16 extends continuously around the periphery of the entire sidewalls 14 of the sifting tray 10. The rim 16 may serve as a handle for a user to grab the tray 10. The rim 16 may also be used to stiffen and/or reinforce the tray 10. Litter can be heavy, so each tray 10 is each individually sufficiently strong to withstand holding litter at a height and to withstand a sifting motion. Stiffening the tray can help prevent the tray 10 from buckling, twisting, deforming past the point of failure, or breaking.

The sifting tray 10 may comprise protrusions 26 which are attached to the first portion 18 of each end of the rim 16. The protrusion 26 may project downwardly from the rim 16 toward the base. The protrusions 26 may extend vertically from the bottom face of the rim 16. The protrusions 26 may have a pointed end. The pointed end may have a smooth or rounded contact surface to avoid scratching a user's hands. The protrusion 26 may be a flat tab. The flat tab may have a reinforcing rib attached to the back to increase the strength and stiffness of the protrusions 26.

A litter box comprising a sifting system may be formed by combining the sifting trays together so that an upper tray is nested in an adjacent lower tray without interference with each other. The sifting system is a container to hold a siftable material such as pet litter without leakage. When containing pet litter, it functions as a conventional pet litter box for a pet to climb into the top tray of the sifting system for excretion of pet waste such as urine and feces. The sifting system also serves as a sieve for separating the litter from the waste by lifting the top tray off its lower trays of the sifting system. Sifting helps separate the pet's solid excrement deposited in the litter and clumped litter from the remaining unused litter. The material which passes through the openings 22 falls into the bottom two trays. This helps conserve unused litter thus saving user's time and money.

A siftable material may be any granular or particulate material that comprises particles of different sizes in which unwanted larger particles need to be removed. For example, the siftable material may be pet litter, such as cat litter. In one preferred application, the sifting tray 10 is used to sift pet litter to remove and dispose solid waste and/or liquid waste clumped litter from the unused portion of the litter. The following will take pet litter as an example to describe how the present invention works with pet litter. However, it should be appreciated that the exemplary pet litter does not serve as a limitation to the siftable material.

Figure 5:
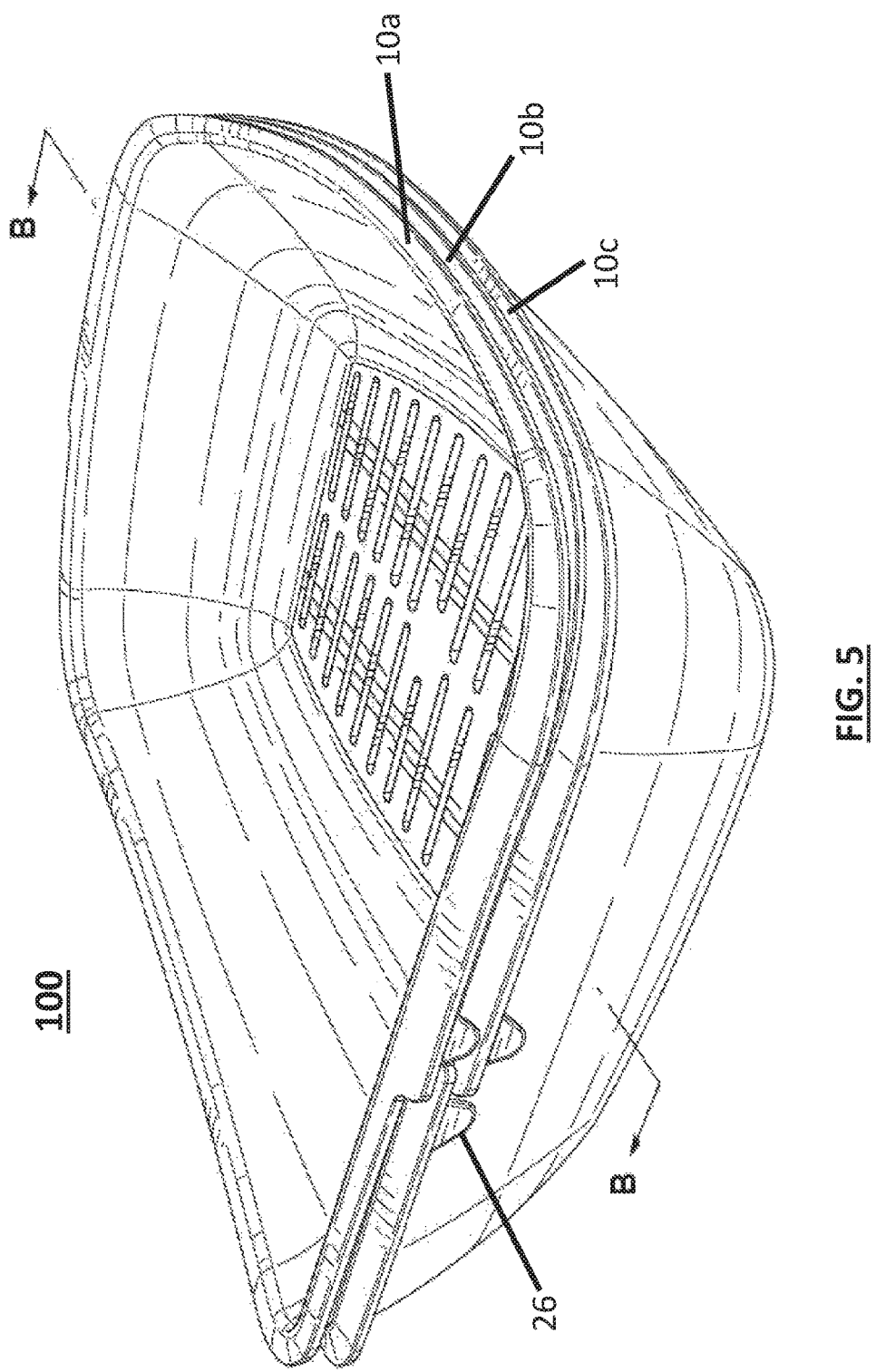
FIG. 5 shows a perspective view of an embodiment of a sifting system according to the present disclosure comprising the trays of FIG. 1.

FIG. 5 shows a sifting system 100 according to the present disclosure. The sifting system 100 comprises three substantially identical sifting trays 10 illustrated in FIGS. 1-4, in which the three sifting trays 10 are stacked one on top of another and each upper tray is nested stably in its adjacent lower tray without interference from each other. For ease of discussion, the three sifting trays 10 are denoted as upper tray 10a, middle tray 10b, and bottom tray 10c from top to bottom, respectively. Of any two stacked adjacent trays of the sifting system, one tray on top of the other may be referred to as an upper tray, and the adjacent lower one may be referred to as a lower tray.

Figure 6:
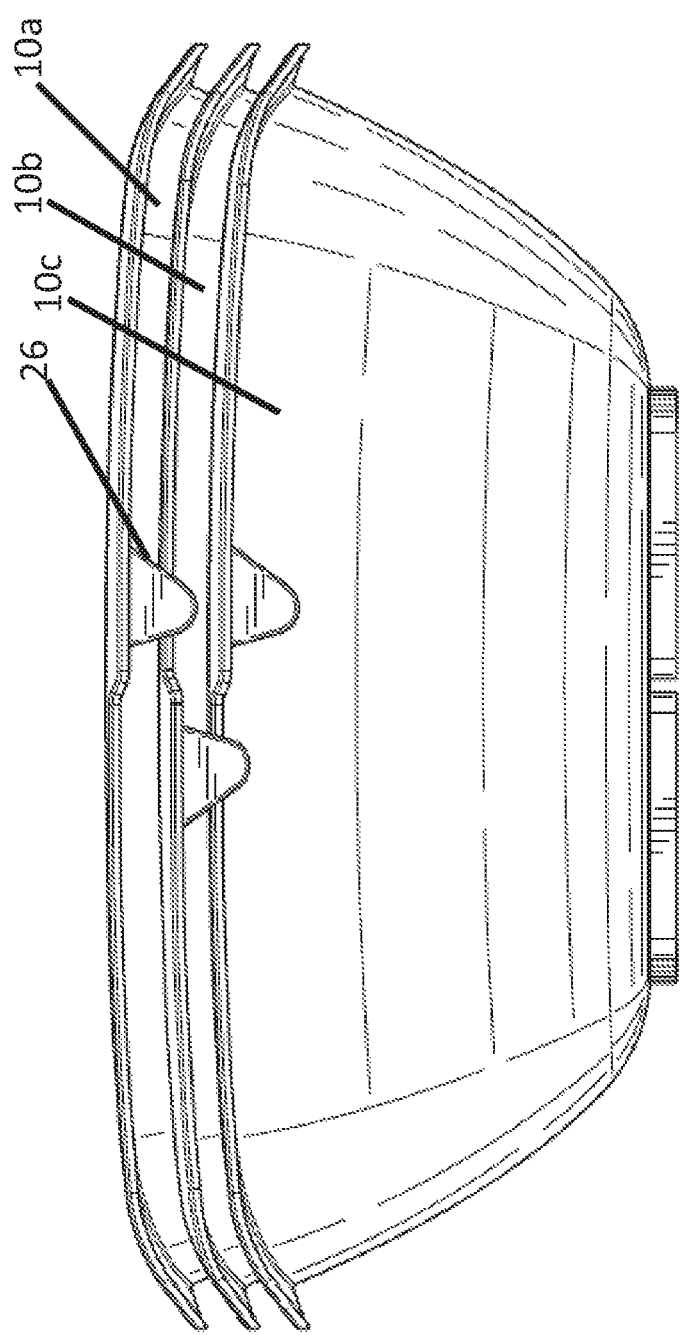
FIG. 6 shows a front view of the sifting system of FIG. 5.

To form the sifting system 100 according to the present invention, the multiple sifting trays 10 are stacked in the correct orientation, one on top of another, without interference therebetween. In this context, when these trays are being stacked, each tray needs to be placed by turning in a generally horizontal plane a pre-determined degree relative to the adjacent tray. The degree of rotation may be 180. FIGS. 5-6 show perspective, side and front views of a sifting system 100 in one embodiment, in which the three trays 10a, 10b, 10c are nested in one another with the correct orientation. Each tray is stacked to each other by being turned 180 degree relative to another adjacent one. Being stacked in this manner, the openings of the slots 22 of the top tray 10a are blocked by the upper base surface 34 of the middle tray 10b, and the slots of the middle tray 10b are also blocked by the lower tray 10c, whereby a material to be sifted is contained within the upper tray 10a and prevented from passing all the way through the slots 22 of the top tray 10a. As such, when the sifting system 100 of the stacked trays is placed on a flat surface, each of the trays 10a, 10b, 10c will sit stably and the upper base surface 34 of the top tray 10a is substantially flat.

FIG. 6 shows a front view of the system 100 of FIG. 5. When the three trays 10a, 10b, 10c are correctly nested in one another in a way described above, the protrusions 26 of the three trays are staggered at either side of the trays such that the protrusions 26 of any tray will not be obstructed by, or otherwise interfere with, any parts of any other trays such as the lip or rim of the other tray. This interference is pronounced by the protrusion 26 helping ensure the user is made aware of the incorrect orientation of the trays. As discussed earlier, due to the width difference between the first portion 18 and the second portion 20 of the rim 16, a recessed area 30 is formed along the second portion 20. When stacking the trays 10a, 10b, 10c, this recessed area 30 enables the protrusions 26 of the top tray 10a and the middle tray 10b to pass through the recessed area of their respective lower trays without obstruction or interference from any other trays. For this purpose, the vertical height of the protrusions 26 of the sifting tray 10a may be less than or equal to the distance from the lower surface of the first portion 18 of the top tray 10a to the face 2 of the bottom tray 10c. In other words, while stacking at least three trays one on top of another, the protrusions 26 of any tray will not interfere with any other trays, which ensures that the slots of any upper tray of the stacking are able to reach down to contact the upper base surface of its adjacent lower tray. Furthermore, to avoid this interference, the protrusions 26 of the sifting tray 10 can be disposed at a position on the lower face of the first portion 18 of the rim 16 such that the protrusions 26 of the top tray 10a and the middle tray 10b can be received within the recessed area 30. Referring to the tray 10 of FIG. 1, for example, the distance H3 should be more than the distance H4.

Figure 7:
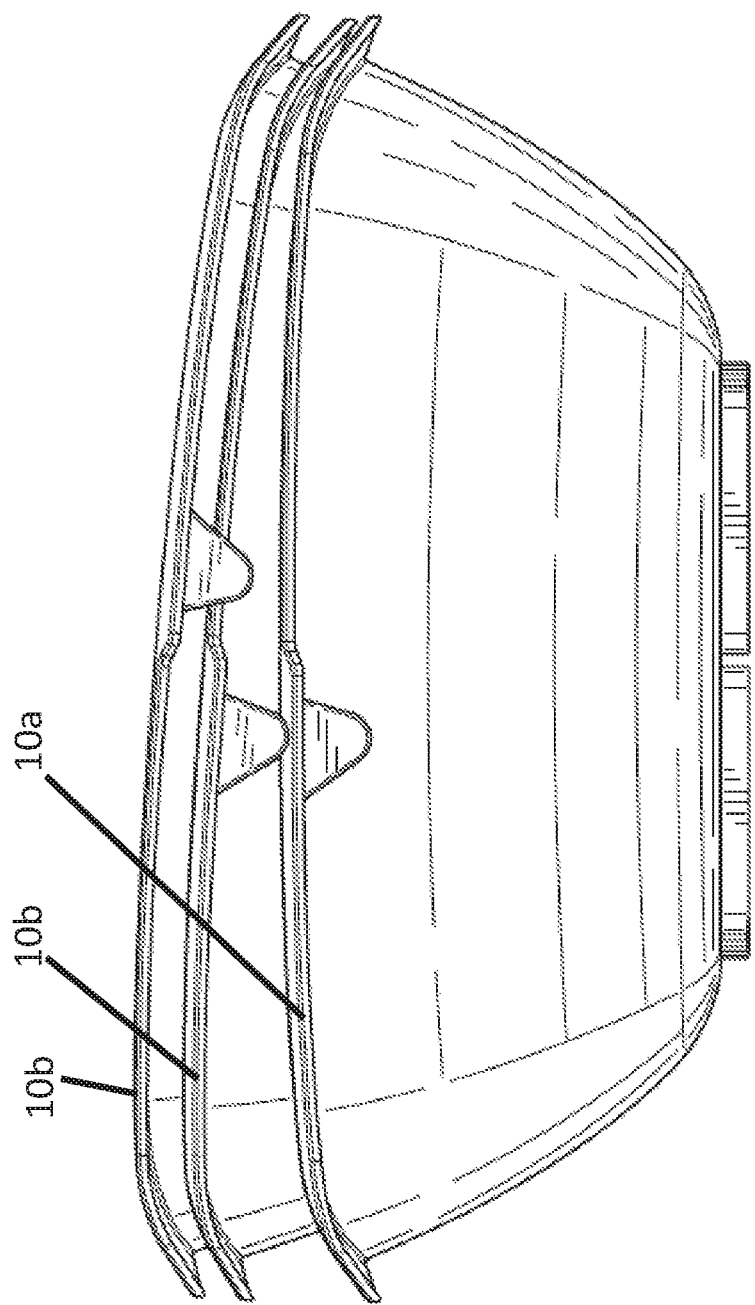
FIG. 7 shows a front view of the sifting system of FIG. 5 with two trays incorrectly oriented.

FIG. 7 shows a front view of the system 100 of FIG. 5 wherein the middle tray 10b and the bottom tray 10c are not correctly oriented with respect to each other. Because the orientation is not correct, the protrusion of the middle tray 10b contacts the rim of the bottom tray 10c. This causes the middle tray 10b to rock within the bottom tray 10c giving indicating to the user that the trays are not correctly oriented.

Figure 8:
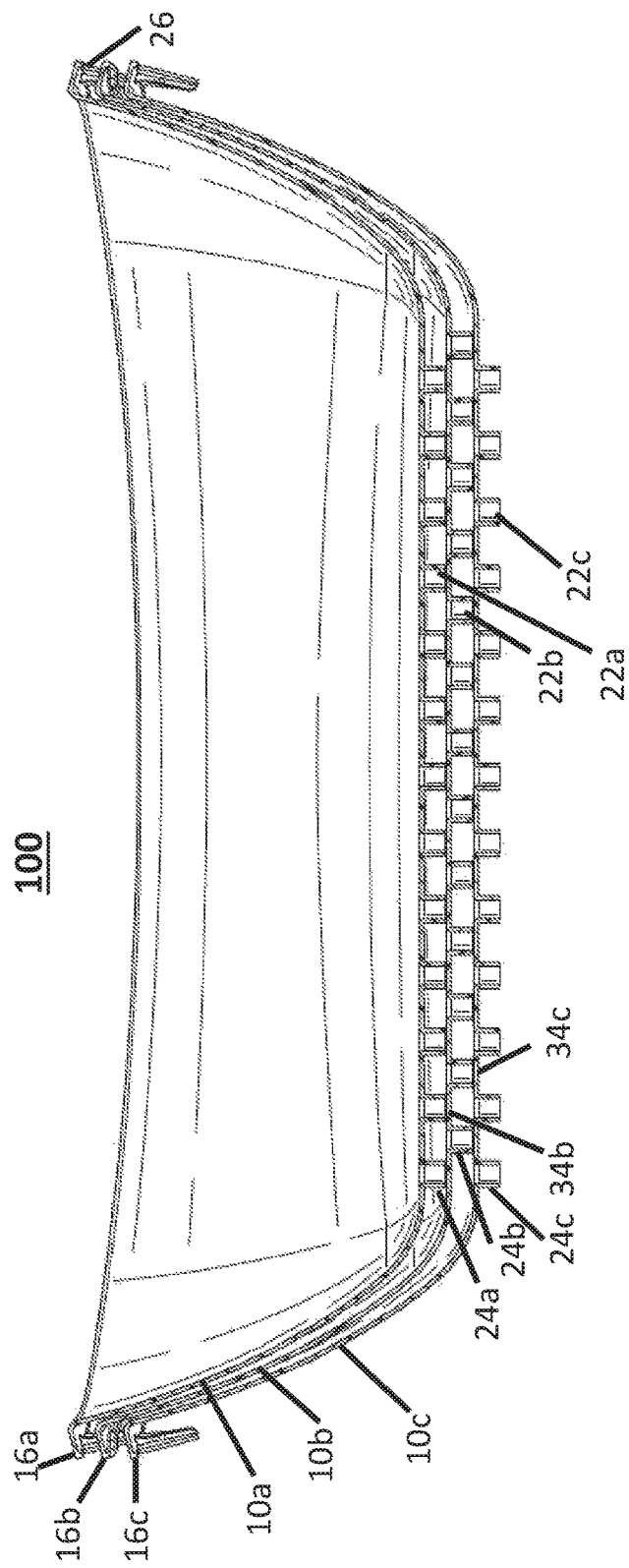
FIG. 8 shows a cross-sectional view of the sifting system of FIG. 5 taken from cut lines B-B.

FIG. 8 shows a cross-sectional side view of the sifting system 100 of FIG. 5 taken from the line B-B of FIG. 5. Tray 10a is nested in tray 10b, and tray 10b is nested in tray 10c. The flanges 24a, 24b, 24c of each upper tray contact the upper surface 34 of the base 12 of the lower tray such that the opening of the flanges 24a, 24b, 24c are completely occluded. The flanges 24a, 24b of the trays 10a, 10b separate or space apparat the trays 10a, 10b and their rims 16a, 16b, 16c. The spacing between the rims can facilitate the user to fit their fingers in to grab the top tray, i.e. tray 10a, with hands from below the rim 16a to lift it up. Furthermore, the flanges 24 can help optimize the nesting of the trays. Without these flanges to properly nest the sifting trays in one another, the base and sidewalls of each tray would need to have a particular configuration to perfectly fit another so as to inhibit the litter from passing through small spaces between the two trays. It may be difficult to achieve such uniform fit and good tolerances across both of the trays. In this way, the flanges may allow for some variation across the top surfaces of the lower tray and the bottom surface of the upper tray. The height of flanges may vary depending on the size of the internal space formed by the sidewalls of the sifting tray. It may allow for the structural design of the sidewalls to be more flexible.

In use, the stacked trays of the sifting system 100 as shown in FIG. 5 may be used as a unitary container to hold a certain amount of a material such as pet litter (e.g. cat litter). When a pet has deposited excrement in the litter, its solid waste and clumped litter formed by liquid excrement may be separated from the unused litter by lifting the top-most tray and agitating or shaking the tray over the remaining stacked trays to cause the unused litter to exit through the slots of the top tray and into the adjacent lower trays. The solid waste and clumped litter which are too large to pass through the slots 22 are left in the tray 10a for discarding. The tray 10a may be further cleaned and washed if desired. Because the bottom two trays have slots arranged in an interference pattern, the sifted litter stays within those two trays without going onto the floor. When the top tray 10a is empty, it is placed on the bottom of the stacked trays 10b, 10c by placing the tray 10a below the stack, and ensuring that the tray 10a and the tray 10c are oriented 180 degree to each other. The operation may now be repeated with the tray 10b being the top-most tray. Additional litter may be added from time to time as desired.

When the user does not stack the trays correctly as shown in FIG. 7, and the user does not notice the incorrect orientation, litter will fall through the slots of the trays to the ground or floor due to the slots of the upper tray not being blocked by the upper base surface of the adjacent lower tray. The structural design and the cooperation of the protrusions and rim of the sifting tray of the present disclosure help indicate to the user that the trays are incorrectly oriented.

FIG. 7 shows an exemplary view in which the trays 10a, 10b, 10c of the sifting system 100 are incorrectly stacked and thus do not properly nest together. The view indicates that the trays 10b and 10c are not turned 180 degree to each other when the tray 10c is placed back below the stacked trays 10a, 10bc after its use. As a result, the protrusions 26b of the tray 10b on its opposing sides fall on the top face of the rim 16c and the tray 10b is thus lifted a certain height away from the tray 10c. Since the protrusions 26b each have a pointed end, which results in that the tray 10b rocks or shakes back and forth when the stacked trays are in use, and that the tray 10a also becomes tilted on its surface. This will help bring the incorrect orientation to the user's attention.

Figure 9:
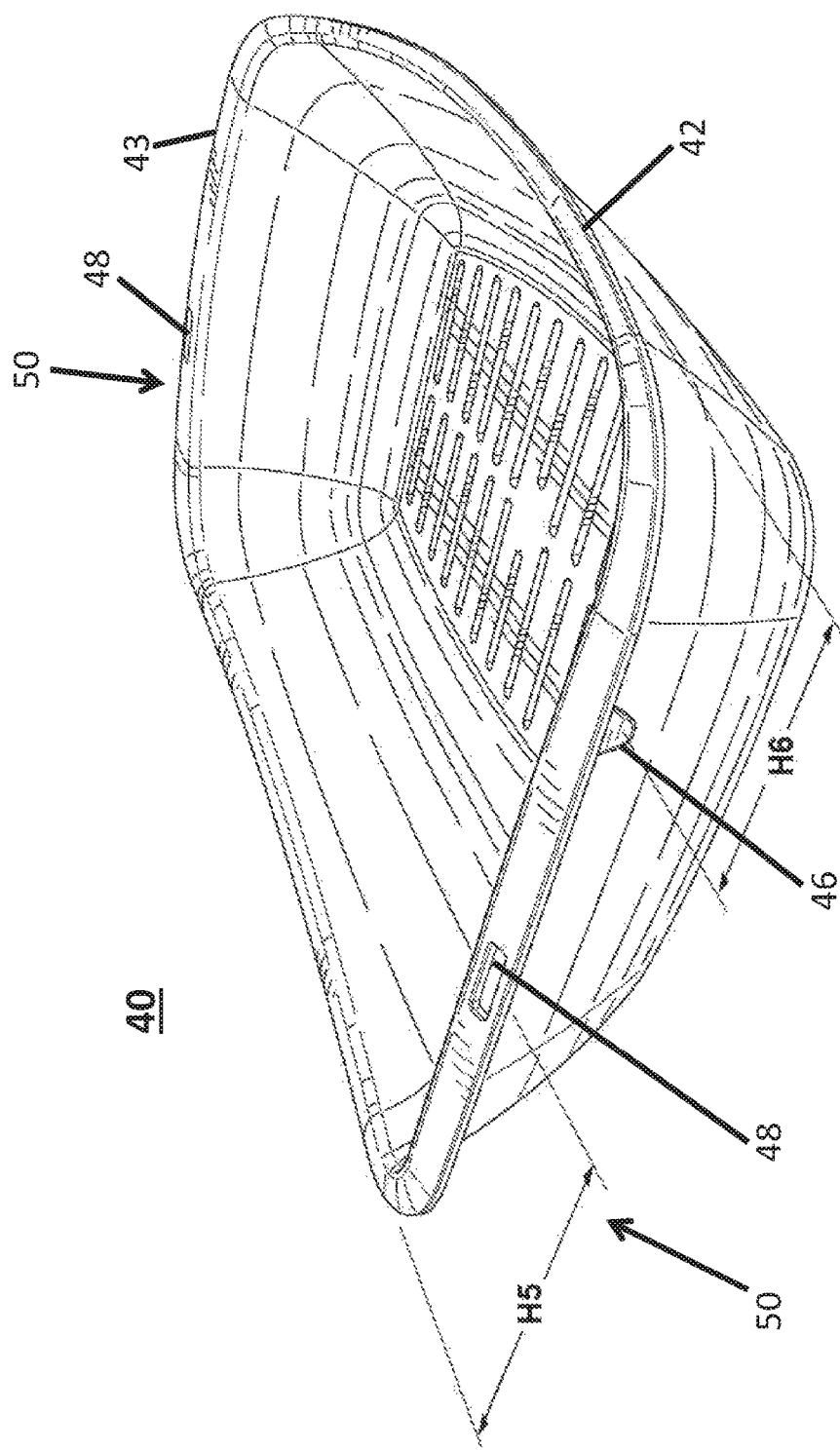
FIG. 9 shows a perspective view of an embodiment of a sifting tray according to the present disclosure.

FIG. 9 shows another embodiment of the sifting tray 40 according to this disclosure. The sifting tray 40 is similar to the sifting tray 10 of FIG. 1. Rather than an asymmetrical lip, the rim 42 has a rim aperture 48 on its surface at each of its opposing sides 50. The dimension of the aperture 48 corresponds to that of the protrusion 46 such that, when another substantially identical sifting tray 40 is stacked on the top by turning 180 degree, the protrusion of the upper tray can pass through the rim aperture 48 of the lower tray. If the trays are not correctly oriented, however, the protrusion does not pass through the aperture 48 and instead hits to the rim 42 resulting in the top sifting tray not nesting properly in the bottom sifting tray.

Figure 10:
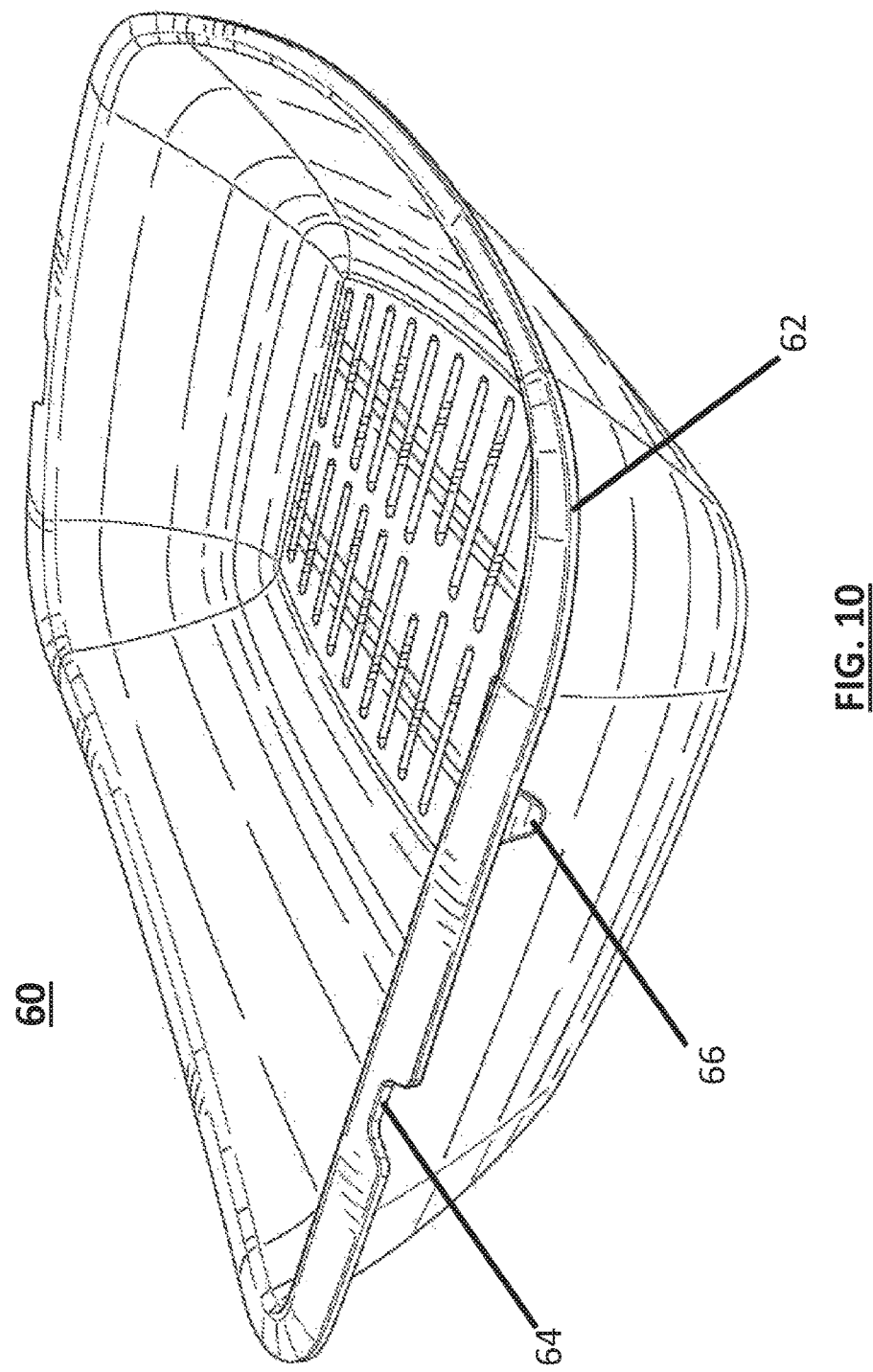
FIG. 10 shows a perspective view of an embodiment of a sifting tray according to the present disclosure.

FIG. 10 shows another embodiment of a sifting tray 60 according to the present disclosure. The sifting tray 60 is similar to the sifting tray 10 of FIG. 1. Rather than an asymmetrical lip, the rim 62 of the sifting tray 60 has a notch 64 at its edge at each of its opposing sides 68. The dimension of the notch 64 corresponds to that of the protrusion 66 such that, when another substantially identical sifting tray 60 is stacked on the top by turning 180 degree, the protrusion of the upper tray can pass through the rim notch 64 of the lower tray. If the trays are not correctly oriented, however, the protrusion does not pass through the notch 64 and instead hits to the rim 62 resulting in the top sifting tray not nesting properly in the bottom sifting tray.

Figure 11:
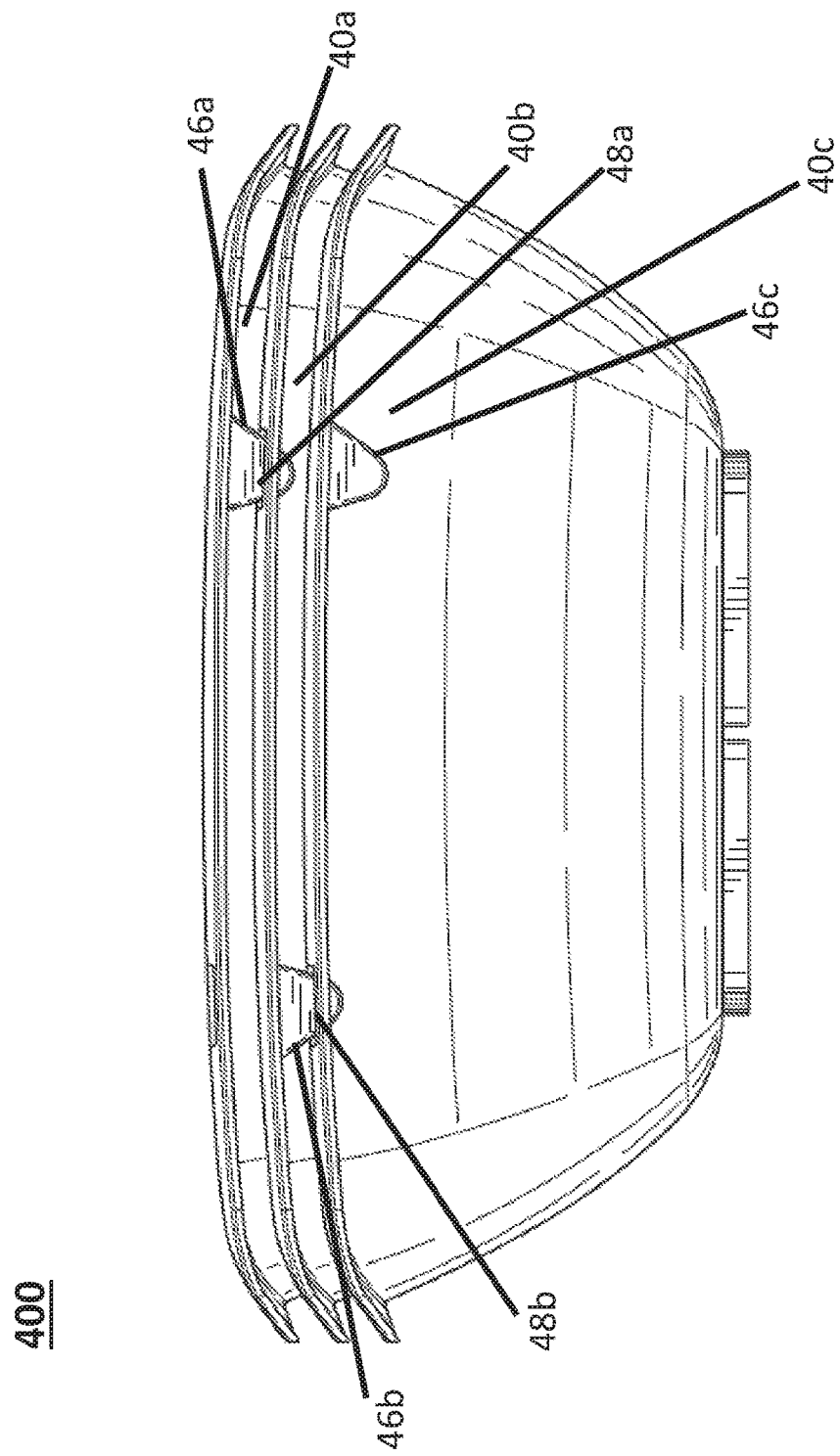
FIG. 11 shows a front view of an embodiment of a sifting system according to the present disclosure comprising three nested sifting trays of FIG. 9.

FIG. 11 shows another embodiment of the sifting system 400 according to the present disclosure. The sifting system 400 as shown comprises three substantially identical sifting trays 40a, 40b, 40c as discussed above and illustrated in FIG. 9, in which the three sifting trays 40a, 40b, 40c are stacked one on top of another and each upper tray is nested stably in its adjacent lower tray without interference from each other. The sifting system 400 is similar to the sifting system 100 except for the placement of the protrusions 46a, 46b. In this embodiment, the protrusions 48a of the sifting tray 40a is received and held in the aperture 48a of the sifting tray 40b, and the protrusions 48b of the sifting tray 40b is received in the aperture 48c of the sifting tray 40c. Protrusions which fit snugly into the apertures can help firmly hold together the stacked trays to inhibit the trays from shaking or moving when the pet climbs into or out of the top tray or moves around in the stack of trays. In an embodiment, the protrusions 46a, 46b, 46c of may be located on the rims of the trays at a position such that the protrusions 46a and 46b of the top tray 40a and the middle tray 40b, respectively, are received in apertures 48a, and 48b, respectively. Referring to the tray 40 in FIG. 9, for example, the distance H5 should be equal to the distance H6. In another embodiment, the protrusions 66 of any upper tray may be received and held in the notch 64 of another adjacent lower tray 60. The engagement of the protrusions and the notch can hold together the stacked trays firmly and stably and can prevent each of the trays in the sifting system from shaking or moving when the pet climbs into or out of the top tray or moves around in it. The above-specified requirements for the arrangement of the aperture 48 and the protrusion 46 as shown in FIG. 9 also apply to that of the notch 64 and the protrusion 66 in FIG. 10.

Figure 13:
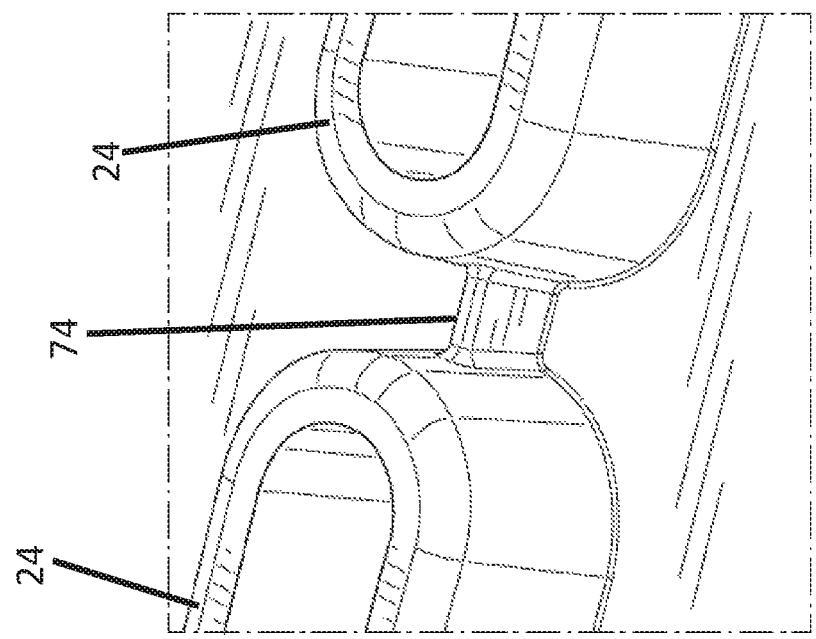
FIGS. 12 and 13 shows perspective expanded views of embodiments of flanges in accordance with the present disclosure.
Figure 12:
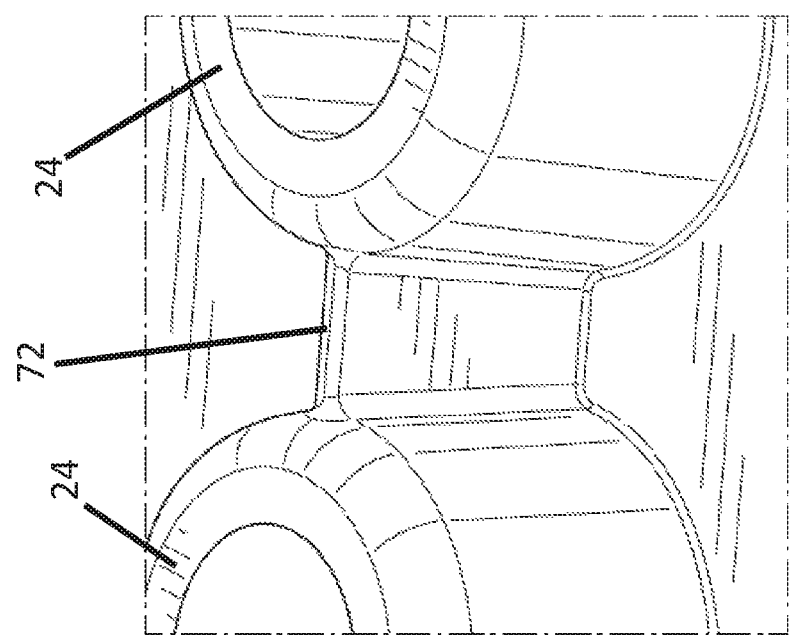

FIGS. 12 and 13 show embodiments of a flange bridge 72, 74 in accordance with this disclosure. A bridge 72,74 connects two adjacent flanges 24 together. The bridges 72, 74 may be a rib. The bridge may be thin portions of plastic. The bridges 72, 74 may be formed at the same time as the entire tray. Bridge thickness may be thinner than the thickness of the flanges wall. The bridges 72, 74 may extend from the external wall of one flange 24 to that of the other flange 24. The flanges 24 connected by the bridges 72, 74 may be on opposite lateral sides of the tray, or on the same lateral side of the tray. The height of the bridge 72, 74 relative to the flange walls may vary. Bridges can help stiffen or strengthen a tray. Bridges can be especially helpful when the base of the tray is very thin. Reducing the thickness of the base helps reduce the overall weight of the tray and the amount of materials used in the tray. This can help reduce material, production, and shippings costs. Lower tray weight can also make it easier for a user to lift a tray and sift the litter therefrom during using. The bridges 72, 74 may also help a tray to resist deformation of the base, such as along the centre line of the tray. The tray is used to sift pet litter, which may comprise aggregate—a heavier material. Furthermore, the bridges 72, 74 can help improve tray base flatness and inhibit tray base bowing during the injection molding and/or manufacturing process, and reduce cooling time. When a molded tray part cools after injection molding, it typically shrinks. Shrinking of the walls of a tray inward can cause the base of the tray to warp or bow as it is contracted. Trays are most susceptible to warping between the flanges where the material is thin. Bridges 72, 74, help resist this warping or bowing by providing lateral support against the flanges. Consequently, the time required to cool a tray may be shortened since bridges 72, 74 inhibit the tray base from warping if the tray is allowed to cool rapidly.

The invention claimed is:

1. A litter tray, comprising:
a base defining an opening to allow a siftable material to pass therethrough;
a flange extending from a lower surface of the base, the flange surrounding the entire periphery of the opening, the flange contacting a second base of a second litter tray and providing separation between the base and the second base when the litter tray is nested within the second litter tray in a selected orientation to inhibit the siftable material from passing through the opening; and
a sidewall extending from the base to retain the siftable material.

2. The litter tray of claim 1, wherein the second litter tray is the same as the litter tray.

3. The litter tray of claim 1, further comprising a protrusion extending from a rim to contact the second litter tray to inhibit the litter tray from nesting when in a second selected orientation within the second litter tray.

4. The litter tray of claim 1, comprising a second flange and a bridge extending from the flange to the second flange.

5. A litter box, comprising:
a plurality of trays, each tray configured to be nested in a first orientation within any of the other trays, each tray comprising:
a base defining an opening to allow a siftable material to pass therethrough;
a flange extending from a lower surface of the base and surrounding the entire periphery of the opening, the flange contacting the base of a lower tray of the plurality of trays to inhibit the siftable material from passing through the opening of the tray and separating the bases when the tray is nested in the lower tray in the first orientation; and
a sidewall extending from the base of the tray to retain the siftable material.

6. The litter box of claim 5, wherein the thickness of the base is no greater than 125 percent of the thickness of the sidewall.

7. The litter box of claim 5, wherein each of the trays further comprises a protrusion extending from the tray, the protrusion to contact a lower tray to inhibit the tray from nesting when in a second orientation within the lower tray.

8. A litter box, comprising:
a plurality of trays, each tray configured to be nested within any of the other trays, each tray comprising:
a base defining an opening to allow a siftable material to pass therethrough;
a sidewall extending from the base to retain the siftable material a flange extending from a lower surface of the base, the flange surrounding the entire periphery of the opening, the flange contacting a second base of a second litter tray and providing separation between the base and the second base when the litter tray Is nested within the second litter tray in a selected orientation to inhibit the siftable material from passing through the opening;

a rim extending from the sidewall;

a protrusion extending from the tray, wherein the protrusion of an upper tray of the plurality of trays contacts an immediately lower tray of the plurality of trays to inhibit the upper tray from nesting in a second orientation within the lower tray.

9. The litter box of claim 8, wherein each of the trays is identical, to one another.

10. The litter box of claim 8, wherein the rim defines a second opening, the second opening for permitting the protrusion of the rim of the upper tray to pass therethrough when the trays are in a first orientation.

11. The litter box of claim 10, wherein the second opening is a smaller width rim.

12. The litter box of claim 10, wherein the second opening is an aperture.

13. The litter box of claim 10, wherein the second opening is a notch.

14. The litter box of claim 8, wherein the protrusion forms a pivot point at its end to cause the upper tray to rest at an angle relative to the lower tray when stacked in the second orientation.

15. The litter box of claim 8, wherein each of the trays comprises a flange extending from around the opening to a position such that when the upper tray is nested in a first orientation within the immediately lower tray, the flange of the upper tray contacts the base of the lower tray to retain a the siftable material in the opening.

16. A litter box, comprising:

three trays, each tray configured to be nested within any of the other trays, each tray comprising:

a base defining a plurality of openings to allow a siftable material to pass therethrough;

a plurality of flanges, each flange extending from a lower surface of the base around the entire periphery of one of the openings, the flanges contacting the base of a lower tray of the three trays to inhibit the siftable material from passing through the openings of the tray and providing separation between the bases when the tray is nested in the lower tray in a first orientation, each flange having a height equal to or greater than twice the thickness of the base; and a sidewall extending from the base of the tray to retain the siftable material within the tray, the base having a thickness no greater than 1.25 times the thickness of the sidewall.

17. The litter box of claim 16, comprising a second flange and a rib connecting the first flange and the second flange.

18. The litter box of claim 17, wherein the rib helps inhibit warping of the base of each tray during cooling after injection molding.

19. The litter box of claim 16, wherein each tray is configured to provide a gap between the sidewalls of each tray and the lower tray when nested.

* * * * *